INVENTOR.
SHIGEKI KAKIZAWA
BY
OSTROLENK, FABER, GERB & SOFFEN
ATTORNEYS

INVENTOR.
SHIGEKI KAKIZAWA
BY
OSTROLENK, FABER, GERB & SOFFEN
ATTORNEYS

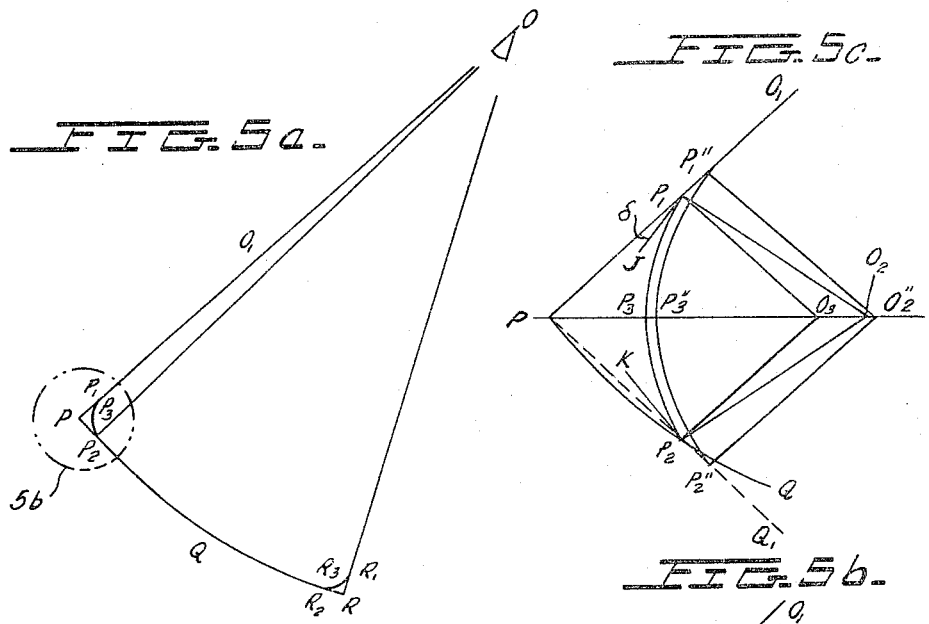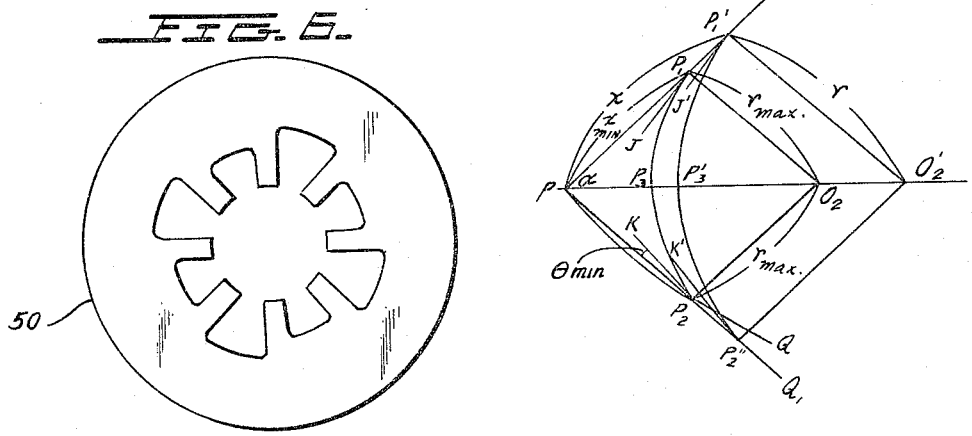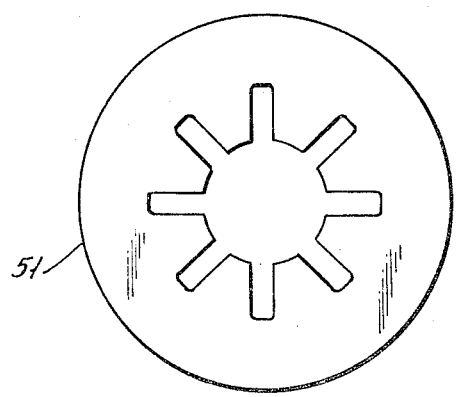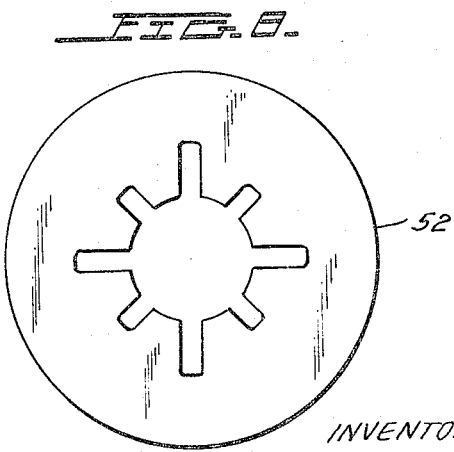
INVENTOR
SHIGEKI KAKIZAWA
OSTROLENK, FABER, GERB & SOFFEN-ATTYS United States Patent Office 3,327,161
Patented June 20, 1967

3,327,161
MAGNETRON ANODE STRUCTURE HAVING CAVITIES WITH ROUNDED CORNERS SO THAT SOLDER SEEPAGE CANNOT OCCUR DURING BRAZING
Shigeki Kakizawa, Minatoku, Tokyo, Japan, assignor to Nippon Electric Company Limited, Minatoku, Tokyo, Japan
Filed Sept. 24, 1964, Ser. No. 399,004
Claims priority, application Japan, Sept. 28, 1963, 38/51,823
6 Claims. (Cl. 315—39.75)

This invention relates to magnetrons and more specifically relates to a novel structure for stacked plates secured to one another by interposed solder wafers wherein internal cavities defined by the plates have rounded internal corner regions. More particularly, a curvature radius, the solder and the soldering temperature are selected such that solder seepage cannot occur during brazing.

In the manufacture of magnetrons, it is common practice to form the magnetron anode of a plurality of thin plates which are connected to one another by interposed thin solder wafers. Each of the plates will have internal aligned notches or cavities which define the magnetron cavity when the plates are stacked. In a typical device, eight cavities could be used.

Generally, these cavities are formed in the plates by a stamping operation, the cavities having a generally rectangular or annular sector configuration. In the past, the corners of the rectangular or annular sector cavities have been sharp corners. These plates are then stacked with their interposed solder wafers and the entire assembly is placed in a suitable furnace so that the adjacent wafers may be brazed together. It has been found that during this operation, the solder of the wafer will seep into formerly sharp corners of the cavities whereupon the calculated shape of the magnetron cavities is altered. Moreover, the change of dimension of the various cavities from their calculated value may vary from cavity to cavity since the temperature in the furnace may not be exactly evenly distributed. When this occurs and during operation of the anode, energy transfer from electron groups propagating from cathode to anode and moving coaxially with the anode to the radio frequency wave structure formed by the resonant cavities is hampered thereby causing low output power, frequency shift, bad frequency spectrum, instability and so on. Even where the temperature distribution in the furnace is even, the curved surface formed in the sharp corners by seeping solder varies markedly from anode to anode with very small inevitable temperature changes, thereby causing, more frequency shift and the like, in an uncontrollable and unanticipated manner.

In order to overcome the problems created by seeping solder, attempts have been made to mechanically finish the cavities after soldering. This, however, is a time-consuming operation, wholly unsuited for mass production techniques. Moreover, accuracy of dimensions of the finished cavities is worse than that of the cavities not distorted by solder seepage.

Another attempt to overcome these problems has been to reduce the volume of the solder plate. This, however, has been found to create possible leakage paths between the resonant cavities and water cooling cavities in the anode plates to result in deterioration of the magnetron.

The principle of the present invention is to provide the individual plates forming the anode with cavities having rounded corners rather than sharp corners. In particular, the cavity corners are provided with a radius of curvature which is such that melted solder will not coat these surfaces during the soldering operation so that the original calculated geometry of the cavity is retained in the finished product. More particularly, it has been found that a radius of curvature of each corner can be selected which is greater than the radius of curvature of the melted solder that could be assumed by the solder seepage in the brazing temperature range. The brazing temperature range is further selected in conjunction with the solder material which is such that the angle of intersection at which the round corners contact the side and back edges of their cavities are equal to or less than the minimum value of the angle of contact which the melted solder can have in that temperature range.

Accordingly, a primary object of this invention is to provide a novel stamped plate structure for magnetrons.

Another object of this invention is to provide a novel anode structure for magnetrons whose characteristics remain unchanged after brazing the anode plates together.

A further object of this invention is to provide a novel plate for magnetron anodes which prevents seepage of solder into the magnetron cavities.

These and other objects of the instant invention will become apparent when reading the accompanying description and drawings in which:

FIGURE 2 is a cross-sectional view taken through an assembly of stacked plates of the type shown in FIGURES 1a through 1f and is, for example, taken across the lines 2—2 in FIGURE 1a.

FIGURE 3a is a top view of the stack of FIGURE 2 after the brazing operation, and particularly illustrating the seepage of solder into the sharp cavity corners of the plates.

FIGURE 3b is an enlarged view of the seepage of solder in the circled area 3b in FIGURE 3a.

FIGURE 3c is a partial cross-sectional view taken across the lines 34—34 in FIGURE 3b illustrating the theoretical solder seepage along the length of the stack of laminations.

FIGURE 3d is similar to FIGURE 3c, but illustrates the actual accumulation of solder along the length of the stack of FIGURE 3a.

FIGURE 5a is a detailed view showing one aperture, and FIGURES 5b and 5c illustrate enlarged views of the area 5b circled in FIGURE 5a for purpose of analysis, illustrating the manner of preventing a solder coating on the cavity corners when using a radius of curvature at these corners.

FIGURES 6, 7 and 8 illustrate a second, third and fourth embodiment of the invention, respectively, wherein the curved radius concept is applied to the other anode cavity forms.

Figure 1A:
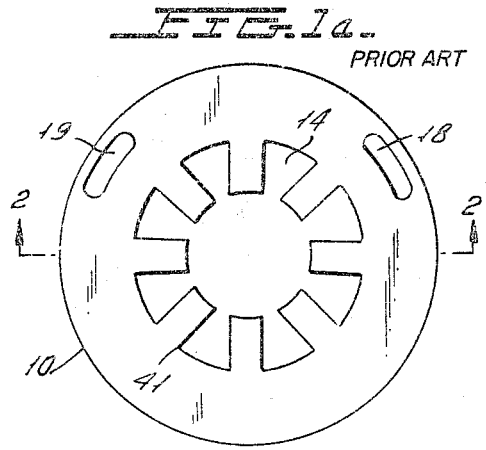
FIGURE 1a is a top view of a first plate for a magnetron anode stack.
Figure 1B:
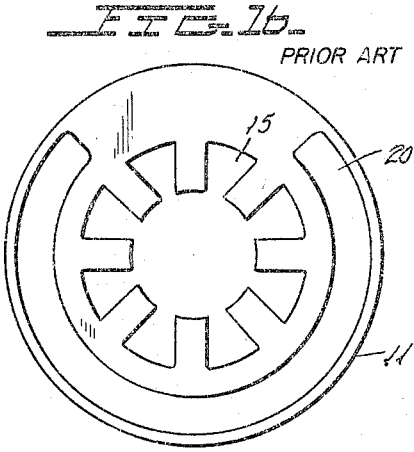
FIGURE 1b is a top view of a second plate of a magnetron anode stack.
Figure 1C:
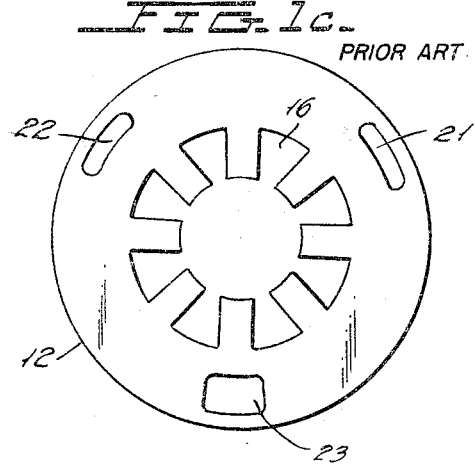
FIGURE 1c is a top view of a third plate of a magnetron anode stack.
Figure 1D:
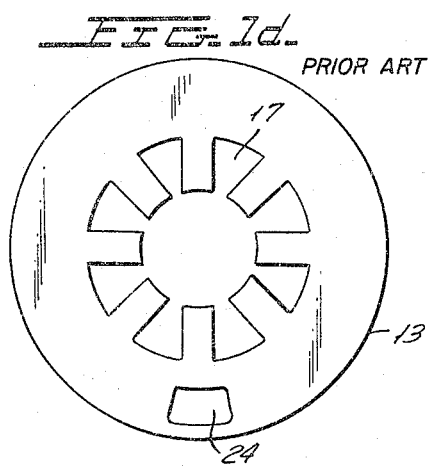
FIGURE 1d is a top view of the fourth plate of a magnetron anode stack.

Referring first to FIGURES 1a through 1d, there are illustrated therein typical anode plates or laminations which are stacked atop one another and soldered to one another to form a magnetron anode. Each of plates 10, 11, 12 and 13 of FIGURES 1a through 1d, respectively, are thin metal plates, formed, for example, of an oxygen-free, high conductivity copper plate having a thickness of the order of from 0.5 to 1.5 millimeters. Each of the plates are normally formed by stamping and in the embodiment of FIGURES 1a through 1d have eight identically arranged fan shaped cutout sections, such as cutout sections 14, 15, 16 and 17, respectively. When these plates are stacked they will therefore define eight cavities for the anode.

The plates are further provided with water cooling channels, such as channels 18 and 19 in lamination 10, channel 20 in lamination 11, channels 21, 22 and 23 in lamination 12 and channel 24 in lamination 13. Note that when the plates are stacked atop one another, that channels 18 and 19 of plate 10 will overlie the upper ends of channels 20 in plate 11 of FIGURE 1b. The channels 21 and 22 in plate 12 of FIGURE 1c will then underlie the two upper ends of channel 20 in FIGURE 1b and the channel 23 of the plate 12 of FIGURE 1c will underlie the middle portion of channel 20 in FIGURE 1b. The channel 24 of plate 13 of FIGURE 1d will then underlie channel 20 of plate 11 and so on, thus a complete water cooling passage is formed through the stacked plates.

In order to connect the plates to one another, it is common practice to provide solder wafers between adjacent plates which will not interfere with either the water cooling channels or the cavities. For this purpose two solder wafers 25 and 26, shown in FIGURES 1e and 1f, respectively, are used which have a typical thickness of from 0.02 to 0.05 millimeter. The solder plate 25 of FIGURE 1e has a configuration identical to that of plate 10 of FIGURE 1a and is provided with eight slots or cavities, such as cavity 27 arranged in a fan-type manner, and two apertures 29 and 30 corresponding to apertures 18 and 19 in FIGURE 1a. The solder plate 26 of FIGURE 1f corresponds to the shape of plate 11 of FIGURE 1b, and thus has the cavity portions, such as cavity 28, and an arcuate channel 31.

Figure 1E:
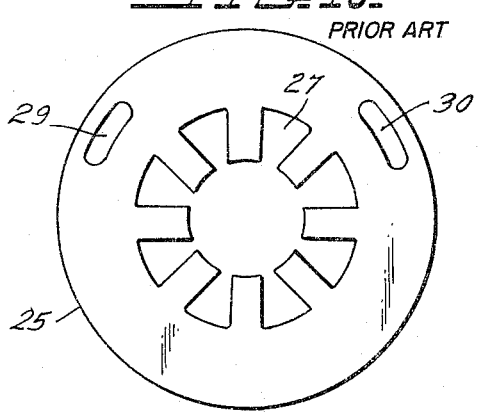
FIGURE 1e shows a top plan view of first solder wafer for joining the plates of a stacked magnetron anode.
Figure 1F:
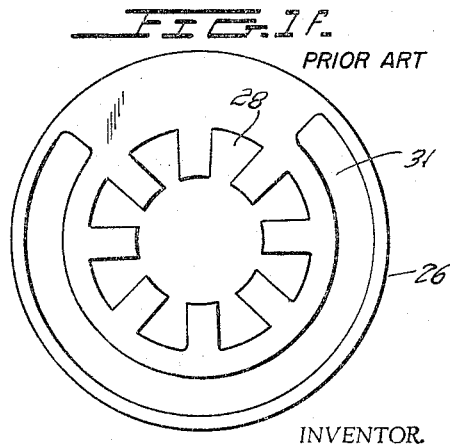
FIGURE 1f illustrates a second solder wafer for connecting the laminations of a magnetron anode.

When connecting the plates of FIGURES 1a through 1d together to form an anode, the plates are stacked in the manner illustrated in FIGURE 2. Thus, the upper plate in FIGURE 2 is the plate 10 FIGURE 1a. The solder plate 25 of FIGURE 1e is placed below the plate 10 and above the next plate 10 of FIGURE 1a. The solder plate 26 of FIGURE 1f is then placed below plate 10 and above plate 11 in FIGURE 1b. The solder plates 26 of FIGURE 1f are then placed between two plates 11 and plate 13 of FIGURE 1d with the plates being again restacked as plates 10, 11, 12 and 13 along the alternating interposed solder wafers 25 and 26, as indicated. Note that in FIGURE 2 only a single plate thickness has been used between each pair of solder wafers. If desired, more than one plate thickness could be used with additional solder plates being similarly used. Thus, it would be possible to stack plates in the following order beginning from the top: 10–25–10–26–11–26–11–26–12–26–11–26 – 11 – 26– 13–26–11–26–11–26–12–26–11–26–11–26 – 10 – 25 – 10. Clearly, however, any stacking procedure would come within the concept of the present invention.

Regardless of the method of stacking, a jig is commonly used so that the peripheries of the eight resonant cavities and cooling passages of each of plates and solder wafers are exactly aligned with one another. After this stacking, the anode is appropriately rigidly bound together and inserted in a suitable furnace filled with a suitable reducing atmosphere for the brazing operation. During the brazing operation, the liquidized solder material of plates 25 and 26 wet their adjacent anode plates and will flow into the various resonant cavities, filling the corners of the fan-shaped cavities, as illustrated in FIGURES 3a, 3b and 3d. That is to say, the prior art stamped plates were normally provided with sharp corner regions which are subsequently filled with solder after the brazing operation. Clearly, this alters the geometry of the resonant cavities in an uncontrolled and unpredetermined manner thereby affecting the operation of the anode.

FIGURE 3b illustrates the formation of a typical cavity in the plates of FIGURE 3a as including sharp corners defined by wall surfaces 32 and 33. The solder pocket caused by seepage is the solder pocket 35 which has a radius of curvature $r_1$ of the melted solder and an angle contact $\theta$ which is the angle between boundary surface 32 (or 33) and a tangent of melted solder material at the point where the front surface of the solder meets boundary surface 32 (or 33). In addition and as shown in FIGURE 3c which is a cross-sectional view of FIGURE 3b taken across lines 34—34 the solder pocket 35 theoretically (ignoring the weight of the solder) will have an outline as illustrated having a radius of the curvature $r_2$.

The radius of curvature of a melted solder surface is given by the following well known relation which ignores the weight of the solder $$\Delta P = T\left(\frac{1}{r_1} + \frac{1}{r_2}\right) \qquad (1)$$

where $\Delta P$ is the pressure difference between the inside and outside of the solder surface boundary, T is the surface tension of the solder in its fluid state, while $r_1$ and $r_2$ are the radii shown in FIGURES 3b and 3c, respectively. As a practical matter, solder has weight so that the surface curvature of FIGURE 3c will, in fact, have the shape indicated in FIGURE 3d. This, however, can be disregarded as will be described more fully hereinafter.

The quantities $\Delta P$ and T are each functions of temperature and are extremely sensitive to small temperature changes. For this reason, the shape of the solder pocket 35 is widely variable even in the same furnace where temperature fluctuations are apt to occur and the temperature will vary at different locations within the furnace. Therefore, the cavity geometry ultimately formed will vary from its theoretical calculated value. That is, since the quantities $\Delta P$ and T are extremely sensitive to small temperature changes, the radii $r_1$ and $r_2$ (and solder seepage) will similarly be very sensitive to small temperature changes.

Figure 4A:
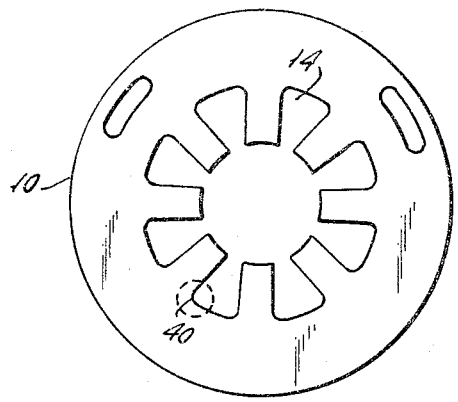
FIGURES 4a through 4f illustrate the novel plate structure of the invention, and correspond to the prior art plate structure illustrated in FIGURES 1a through 1f, respectively.
Figure 4B:
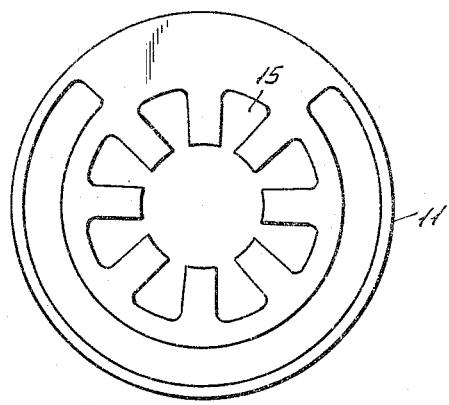
Figure 4C:
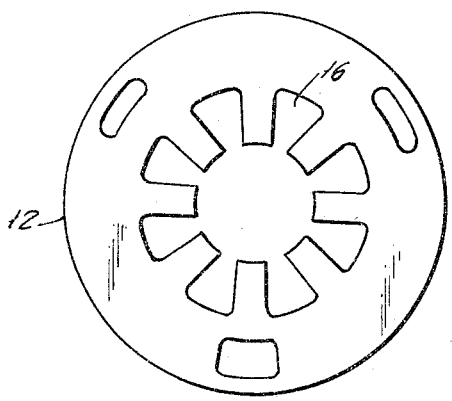
Figure 4D:
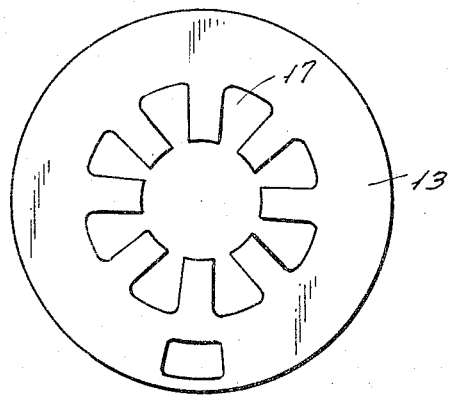
Figure 4E:
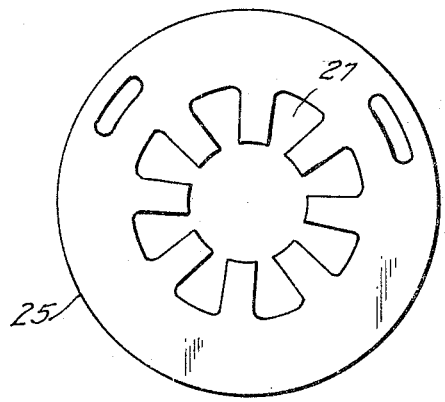
Figure 4F:
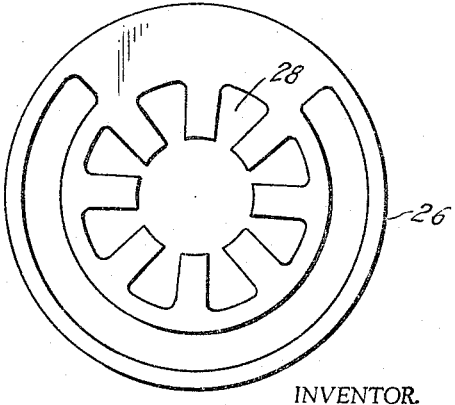

The principle of the present invention is to form the cavity structures in the plates of FIGURES 1a through 1d to have rounded corner sections, as shown in FIGURES 4a through 4d, respectively. Thus, in FIGURES 4a through 4d the plates 10 through 13, respectively (along with solder plates 25 and 26), have rounded corner regions in their cavity portions, such as cavities 14 through 17, 27 and 28. Thus, the edge 40, shown in FIGURE 4a, is a rounded edge, as contrasted to the corresponding sharp edge 41 of plate 10 of FIGURE 1a.

More particularly, the radius of the rounded edges of the plates of FIGURES 4a through 4f have a radius of curvature which is sufficiently large to prevent solder seepage in that area. To understand this novel arrangement and assuming that $r_2$ is infinite in Equation (1), the equation reduces to $$r = \frac{T}{\Delta P} \qquad (2)$$

where T and $\Delta P$ are functions of the temperature of the melted solder and r is the radius of curvature of the melted solder surface. This, of course, is to be expected since when the melted solder is liquefied, it is well known that its surface tension T decreases markedly with increasing temperature so that the angle of contact $\theta$ and the radius of curvature r of the solder formed in the cavities will decrease. By considering this matter with Equation (2) rather than Equation (1), the problem of solder seepage is transformed from a three-dimensional problem to a two-dimensional problem. If it can be proven in a two-dimensional plane that solder would never flow inside a curve which satisfies Equation (2), the curved surface of the solder in the cavities given by Equation (1) can never be formed. Thus, it is theoretically permissible to ignore the radius $r_2$ and to assume this radius to be infinite.

As stated above, since the radius of curvature $r$ of the melted solder varies with the solder temperature, it is necessary to set the radius of curvature of the corner at a maximum value on the radius of curvature of the melted solder $r_{max}$ in a range of expected brazing temperatures which normally lie between the flow point of the solder and a temperature 50° C. higher than this point. Generally, if the melting point of the solder is temperature $t_1$, and the actual brazing temperature is temperature $t_2$ and the solidifying point of solder after brazing is $t_3$, the relation $t_1 < t_3 < t_2$ prevails. This is due to a fact that the material of anode plates dissolve into the liquid solder, whereby the composition of solder is somewhat changed. Accordingly, $r_{max}$ is generally considered to be the radius of curvature of the melted solder $T/\Delta P$ at temperature $t_3$.

The angle of intersection $\theta$ at which the rounded section of the curved corner intersects the sides of the fan-shaped cavities is set at a value $\theta_{min}$ which is the minimum angle of contact which is formed by the melted solder in the said temperature range. As the angle of contact generally decreases with increasing temperature, its value at the brazing temperature $t_2$ may be considered as $\theta_{min}$. Accordingly, and in accordance with the invention, the rounded corners are found to have a radius of curvature which is larger than the value $r_{max} = T/\Delta P$ (at the solidifying temperature $t_3$) and an angle of intersection $\theta$ which (at temperature $t_2$) is less than the minimum angle of intersection $\theta_{min}$ that the particular melted solder can assume.

In the following, it is proven that there can be no solder seepage into a cavity which has corners having roundness of the radius of curvature of the value $r_{max}$ and an angle of intersection of the value $\theta_{min}$ with the walls of the cavity.

FIGURE 5a is an enlarged view of the fan-shaped cavity. It must be proved that the solder cannot flow into the inside of a new cavity $OO_1P_1P_3P_2QR_2R_3R_1O$ having a roundness as shown by the arcs $\overline{P_1P_3P_2}$ and $\overline{R_1R_3R_2}$ at its outer corners. This cavity is identical to the conventional fan-shape cavity $OO_1$ PQRO except at its corners. FIGURE 5b is an enlarged view of the circled region 5b shown in FIGURE 5a. Since the quantity of solder seepage is small as compared with the size of the cavity, arcs $\overline{PP_2}$ and $\overline{RR_2}$ are assumed to be straight lines. Accordingly, in FIGURE 5b, a straight line $\overline{PP_2Q_1}$ is employed instead of arc $\overline{PP_2Q}$ as the circumferential part of the cavity. The angle of the corner $\angle O_1P_1PP_2Q_1$ is taken as $2\alpha$.

When the corner roundness according to the present invention is the arc $\overline{P_1P_3P_2}$ and the center of curvature of this arc is $O_2$, then:

$$\overline{O_2P_1} = \overline{O_2P_2} = r_{max}$$

wherein $P_1$ and $P_2$ are the points at which the arc $\overline{P_1P_3P_2}$, according to the present invention, meets the circumferential surfaces. $O_2$ is on the bisector $\overline{PO_2}'$ of the angle $\angle P_1PP_2 = 2\alpha$. The intersection of this bisector with the arc $\overline{P_1P_3P_2}$ provided by the present invention is $P_3$. If the tangential lines $\overline{P_1J}$ and $\overline{P_2K}$ are drawn to the arc $\overline{P_1P_3P_2}$ at points $P_1$ and $P_2$, respectively, then:

$$\angle PP_1J = \angle PP_2K = \theta_{min}$$

Assume now that solder flows inside the arc $\overline{P_1P_3P_2}$, and arc $\overline{P_1'P_3'P_2'}$ is the front face of the solder. If the center of the curvature is considered be $O_2'$, $$\overline{O_2'P_1'} = \overline{O_2'P_2'} = r$$

$O_2'$ is on the straight line $\overline{PO_2}$ or on an elongation thereof. $P_1'$ and $P_2'$ are the points where the arc $\overline{P_1'P_3'P_2'}$, which defines the surface of the melted solder, meets the circumferential parts of the cavity, $\overline{O_1P}$ and $\overline{Q_1P}$, respectively. At the points $P_1'$ and $P_2'$, the tangential lines $\overline{P_1'J'}$ and $\overline{P_2'K'}$ are drawn out with the arc $\overline{P_1'P_3'P_2'}$, with:

$$\angle PP_1'J' = \angle PP_2'K' = \theta$$

which is the angle of contact formed by the melted solder in the cavity. If we let $\overline{PP_1'} = X$, and apply the rule of sines to the triangle $P_1'PO_2'$, we obtain the following equation:

$$\frac{r}{\sin \alpha} = \frac{X}{\sin \angle P_1'O_2'P} \quad (3)$$

However, in the triangle $P_1'PO_2'$, $$\angle P_1'O_2'P = 180° \ldots PP_1'O_2' = 180° \ldots (90° + \theta)$$

Then, the Equation 3 becomes, $$\frac{r}{\sin \alpha} = \frac{X}{\sin(90° - \theta - \alpha)} = \frac{X}{\cos(\theta + \alpha)} \quad (4)$$

or, in another form, $$\frac{r}{x} = \frac{\sin \alpha}{\cos(\theta + \alpha)} \quad (5)$$

wherein $\angle O_1PQ_1 = 2\alpha \leq 90°$, and accordingly $0° < \alpha < 45°$. Further, as $0° < \theta < 45°$ in the ordinary solder, we have $0° < \theta + \alpha < 90°$. Similarly, if the rule of sines is applied to the triangle $P_1PO_2$, $$\frac{r_{max}}{X_{min}} = \frac{\sin \alpha}{\cos(\theta_{min} + \alpha)} \quad (6)$$

wherein it is assumed that $\overline{PP_1} = X_{min}$, and, of course, $0° < \theta_{min} + \alpha < 90°$.

From Equations 5 and 6, we have, $$\frac{r}{X} \cos(\theta + \alpha) = \frac{r_{max}}{X_{min}} \cos(\theta_{min} + \alpha) = \sin \alpha = \text{constant} \quad (7)$$

However, the solder exists on the right of the arc $\overline{P_1P_3P_2}$ in FIG. 5b, and $\theta_{min}$ and $r_{max}$ are the minimum value of the angle of contact and the maximum value of the radius of curvature respectively when the melted solder forms the curved surfaces. Therefore, we get, $$X > X_{min}, \theta > \theta_{min}, r < r_{max} \quad (8)$$

Accordingly, we get the following equation:

$$0 < \frac{r}{X} < \frac{r_{max}}{X_{min}}$$

$$0 < \cos(\theta + \alpha) < \cos(\theta_{min} + \alpha) \quad (9)$$

It is evident that the Equation 7 is not consistent with the Equation 9. Accordingly, solder cannot flow into the right side of the arc $\overline{P_1P_3P_2}$.

From the above statement, it has been proven that solder cannot flow into the inside of the curved surface $\overline{P_1P_3P_2}$ having a maximum radius of curvature $r_{max}$ and a minimum value of the angle of contact, $\theta_{min}$, which are formed by the melted solder in the range of the soldering temperature.

It may be possible to adopt the surface $\overline{P_1''P_3''P_2''}$ which has the same radius $r_{max}$ instead of the curved surface $\overline{P_1P_3P_2}$ and intersects with both surfaces $\overline{O_1P}$ and $\overline{Q_1P}$ of the cavity at less than $\theta_{min}$.

Thus, as shown in FIGURE 5c, the description of arc $\overline{P_1'P_3'P_2'}$ of FIGURE 5b is omitted, but the description of arc $\overline{P_1''P_3''P_2''}$ is made instead, all other portions of the drawing being identical to those of FIGURE 5b. If the center of curvature of arc $\overline{P_1''P_3''P_2''}$ is $O_2''$, the point $O_2''$ is, of course, on the straight line $\overline{PO_2}$ or the elongation thereof. The radius of arc $\overline{P_1''P_3''P_2''}$ is, by definition:

$$\overline{O_2''P_1''} = r_{max} = \overline{O_2P_1} \quad (10)$$

Then, for an angle $\delta$ at which a tangential line at a point $P_1''$ is drawn to the arc $\overline{P_1''P_3''P_2''}$, $\delta$ must be less than $\theta_{min}$ by definition and, $$\angle \overline{PP_1''Q_2''} = \delta + 90° \quad (11)$$

On the other hand, and as in FIGURE 5b, $$\angle PP_1O_2 = \angle PP_1J + \angle JP_1O_2 = \theta_{min} + 90° \quad (12)$$

Therefore, from Equations 11 and 12, $$\angle PP_1O_2 > \angle PP_1''O_2'' \quad (13)$$

It may be proven that the arc $\overline{P_1''P_3''P_2''}$ is similar to the arc $\overline{P_1P_3P_2}$.

If a straight line is drawn in parallel to the line $\overline{O_2''P_1''}$, at a point $P_1$, the intersection thereof with the line $\overline{PO_2}$ or with the elongation thereof is $O_3$, $$\angle PP_1O_3 = \angle PP_1''O_2'' \quad (14)$$

Therefore, from Equation 13, $$\angle PP_1O_3 < \angle PP_1O_2 \quad (15)$$

Accordingly, the point $O_3$ lies to the left of the point $O_2$.

Then, $$\overline{O_3P_1} < \overline{O_2P_1} \quad (16)$$

From Equations 10 and 16, we have $$\overline{O_3P_1} < \overline{O_2''P_1''} \quad (17)$$

However, as the triangle $PP_1O_3$ is similar to triangle $PP_1''O_2''$, from the Equation 14, $$\frac{\overline{PP_1''}}{\overline{PP_1}} = \frac{\overline{O_2''P_1''}}{\overline{O_3P_1}} \quad (18)$$

From Equations 17 and 18, $$\frac{\overline{PP_1''}}{\overline{PP_1}} > 1 \quad (19)$$

Namely, the point $P_1''$ is more distant from the point $P$ than the point $P_1$. Similarly, it can be proved that the point $P_2''$ is more distant from the point $P$ than the point $P_2$. Accordingly, it has been proved that the arc $\overline{P_1''P_3''P_2''}$ has the same radius of curvature as the arc $\overline{P_1P_3P_2}$ and is to the right of the arc $\overline{P_1P_3P_2}$. An extreme case, where the arc $\overline{P_1''P_3''P_2''}$ has an angle of intersection $\delta = 0°$, is very important in practical meaning. Usually, it is very hard to measure the angle of contact and the radius of curvature of the solder and therefore, it is more convenient to use such an arc $\overline{P_1''P_3''P_2''}$ as $\theta = 0°$ instead of the arc $\overline{P_1P_3P_2}$ having the angle of intersection of the value $\theta_{min}$. In practice, the metallographic adhesive mechanism is very complicated when the anode plates are soldered to each other. In cases where the adhesion between the metals forms solid solutions or the adhesion between the metals causes eutectic reaction, or the adhesion between the metals forms an intermetallic compound, and the like, the contact surface between the metals cannot always be definitely measured. Accordingly, it may be difficult to measure $r_{max}$ and $\theta_{min}$. Therefore, an experiment may be performed to confirm that the solder will not enter the cavity having such a roundness upon the approximate determination of $r_{max}$ and $\theta_{min}$. Measurement of only $r_{max}$ to determine the roundness of $\delta = 0°$ is simpler, but thereafter it must be followed by forming the cavity and confirming that no melted solder enters thereinto.

In describing the present invention, the resonant cavities of anode are all of the same fan-shape. Clearly, however, the present invention can be applied to forming any type of plate structure without changing the principles of the present invention. By way of examples, anodes using the so-called rising-sun anode plates 50 shown in FIGURE 6, or slot-cavity anode plates 51 shown in FIGURE 7, or anode plate 52 having chains of larger slot-cavities and smaller slot-cavities in turn shown in FIGURE 8, may be formed by stacking system. In each case, and in accordance with the invention, the internal cavity corners can be rounded as described above.

Although there has been described a preferred embodiment of this novel invention, many variations and modifications will now be apparent to those skilled in the art. Therefore, this invention is not limited by the specific disclosure herein, but only by the appended claims.

The embodiments of the invention in which an exclusive privilege or property is claimed are defined as follows:

1. A magnetron anode comprising a plurality of stacked plates; each of said stacked plates having a plurality of generally sector-shaped slots therein with the slots of said stacked plates being in axial alignment with one another to define a plurality of axially elongated cavities; each of said stacked plates being soldered across its full surface areas to the plates adjacent thereto; each of said elongated cavities having a pair of plane side walls and a substantially arcuate side wall interconnecting the outer ends of said plane side walls and having rounded corners on both circumferential ends of said arcuate side wall; each of said rounded corners having a radius $r$ greater than the maximum radius of curvature of a solder fillet which would seep, in the brazing temperature range, into a similar axially elongated cavity defined by the plane side walls and the substantially arcuate side wall with sharp edge juncture portions being formed between the last-mentioned walls; and the angle $\theta$ between (1) the tangent plane of one of said round corners at the juncture between said one of said round corners and the continuous wall of the first mentioned plane and arcuate side walls and (2) the elongation of said contiguous wall, being less than the minimum angle of contact between a solder fillet and a plane surface of the same material as the magnetron anode in the brazing temperature range.

2. The device substantially as set forth in claim 1 wherein said radius of curvature is of the order of $T/\Delta P$ where $\Delta P$ is the pressure differential across a solder fillet in said corner and T is the surface tension of a molten solder fillet in said corner at the solidifying temperature of said solder.

3. A magnetron anode comprising a plurality of stacked plates; each of said stacked plates having a plurality of generally rectangular slots therein in axial alignment with one another to define a plurality of axially elongated cavities; each of said stacked plates being soldered across its full surface areas to the plates adjacent thereto; each of said elongated cavities having a pair of relatively wide plane side walls and a relatively narrow plane side wall interconnecting the outer ends of said relatively wide plane side walls and having round corners on both chordal ends of a relatively narrow plane side wall; each of said round corners having a radius greater than the maximum radius of curvature of a solder fillet which would seep in the brazing temperature range into a similar axially elongated cavity defined by the adjacent plane side walls with sharp edge juncture portions being formed between the last mentioned walls; and the angle between (1) the tangent plane of one of said round corners at the juncture between said one of said round corners and the contiguous wall of the first-mentioned side walls and (2) the elongation of said contiguous wall being less than the minimum angle of contact between a solder fillet and a plane surface of the same material as the magnetron anode in the brazing temperature range.

4. The device substantially as set forth in claim 3 wherein said radius of curvature is of the order of $T/\Delta P$ where $\Delta P$ is the pressure differential across a solder fillet in said corner and T is the surface tension of a molten solder fillet in said corner at the solidfying temperature of said solder.

5. A magnetron anode assembly comprising a plurality of stacked plates and wafer shaped solder means; each of said stacked plates and solder means having a plurality of sector-shaped slots therein in alignment with one another to define a plurality of cavities; each wafer shaped solder means being positioned between adjacent stacked plates for joining said plates across their full surface areas to the plates adjacent thereto; each of said sector shaped slots being defined by a pair of radially aligned substantially straight sidewalls joined at their outer ends by an arcuate shaped wall forming a corner at each junction point; said corners forming an angle of substantially 90°; said corners being rounded to prevent the seepage of melted solder into said sector shaped slots; the radius of curvature of said rounded corners being greater than the radius of curvature formed by melted solder in the region of said corners in the absence of said rounded corners; said rounded corners joining said slot side walls at a point along said walls to form an angle at said point which is less than an angle formed at said point between the sidewall and the surface of melted solder seeping into said slot in the absence of said rounded corners.

6. The magnetron anode structure of claim 5 wherein the angle formed at a second point along said arcuate slot wall between said rounded corner and said arcuate slot wall is less than an angle formed at said second point between the surface of melted solder seeping into said slot in the absence of said rounded corners.

References Cited

UNITED STATES PATENTS

| | | | |
|---|---|---|---|
| 2,520,955 | 9/1950 | Okress et al. | 315—39.75 X |
| 2,837,696 | 6/1958 | La Rue | 315—39.75 |
| 2,852,720 | 9/1958 | Crapuchettes | 315—39.75 |

HERMAN KARL SAALBACH, *Primary Examiner.*

P. L. GENSLER, *Assistant Examiner.*